United States Patent [19]

Arpin

[11] 4,347,150

[45] Aug. 31, 1982

[54] PENETRATING COMPOSITIONS FOR WET REMOVAL OF FRIABLE INSULATION MATERIALS

[76] Inventor: John Arpin, 1716 Melville St., Ocean, N.J. 07712

[21] Appl. No.: 274,172

[22] Filed: Jun. 16, 1981

[51] Int. Cl.$^3$ .................................................. B08B 7/00
[52] U.S. Cl. ................................ 252/135; 252/174.24; 252/174.23; 134/4
[58] Field of Search ...................... 252/174.24, 174.23, 252/135; 134/4

[56] References Cited

U.S. PATENT DOCUMENTS 3,879,216 4/1975 Austin .................................. 252/160
3,994,744 11/1976 Anderle ........................... 252/174.24

*Primary Examiner*—Sam Silverberg
*Attorney, Agent, or Firm*—Brady, O'Boyle & Gates

[57] ABSTRACT

A two component stripping composition useful for removing a friable material, one of said parts comprising an aqueous silicate solution comprising a water soluble metal silicate such as potassium silicate or a mixture of potassium silicate and sodium silicate and a cationic or nonionic surfactant and the other part comprising an acrylic polymer dispersion component comprising an acrylic polymer latex and a reagent that reacts with alkali metal silicate. The two parts are mixed to provide a blended composition ready for application having a solids content between 5 and 30 weight percent. The stripping composition is particularly useful for wet removal of friable asbestos-containing materials.

11 Claims, No Drawings

PENETRATING COMPOSITIONS FOR WET REMOVAL OF FRIABLE INSULATION MATERIALS

BACKGROUND OF THE INVENTION (1) Field of the Invention

This invention relates to a stripping composition and method for removing friable materials used for thermal insulation, fireproofing, acoustical insulation and decorative finishes and is particularly applicable to the removal of asbestos-containing materials.

(2) Description of the Prior Art

In recent years there has been an increasing awareness of the importance of environmental factors in carcinogenesis. The recognition of widespread environmental contamination by asbestos-containing materials has been of particular concern. Such concern is evidenced in approximately twenty Federal regulations under various laws which regulate human and environmental exposure to asbestos. Despite these regulations, large segments of the population continue to be exposed to this dangerous material especially material in friable form.

The extensive use of asbestos in commerce and industry has created a health hazard of serious consequences for persons inhaling or ingesting the substance. Since the beginning of the century, asbestos has been used as a major constituent or an important additive to many consumer products so that there are many sources of exposure to the general public. For almost forty years asbestos has been widely used in building construction having been sprayed or applied onto structural steel to retard structural collapse during fire and to ceilings and walls for purposes of acoustic and thermal insulation, decoration and condensation control. Many insulation materials consist of a mixture of asbestos and mineral-, rock-, slag-wool or fibrous glass. In other formulations wood pulp and paper fibers and non-fibrous binders such as plaster of paris, vermiculate, perlite and clay are used. Asbestos has also been used in decorative and textured-spray finishes or paints. Some of this asbestos containing material is now known to be damaged or deteriorating and releasing fibers into the building environment.

Unlike most chemical carcinogens asbestos mineral fibers persist in the environment almost indefinitely and represent a continuous source of exposure. Asbestos fibers cannot be easily destroyed or degraded. The size and shape of these fibers give them aerodynamic capability to permit them to remain suspended in air for many hours. The fibers can become suspended in the air and are then available for respiration and retention in the lung. Fibers which have settled to the floor can be reentrained by activity in the area. Thus, even though the release of fibers may be intermittent, there is a potential for continuous exposure.

Friable material is material that can be crumbled, pulverized or reduced to powder under hand pressure. Friable material may be an asbestos-containing material or it may be a material that contains other fibers such as cellulose and glass fibers. It may also include synthetic organic polymer materials in this condition. Friable asbestos material draws particular attention since it is likely to release fibers with minimum disturbance of the surface, cause serious contamination and exposure problems and it has been used in many buildings having high population densities including schools, office buildings and high-rise apartment buildings. Furthermore, as friable asbestos material ages, it can lose its cohesive strength and more readily release fibers. The asbestos content of these materials is usually found in the range of 5 weight percent to 50 weight percent. These materials were usually applied by spraying but have also been applied by troweling and brushing. They are friable in varying degrees depending on the components of the material, the amount of cement or binder added, and the method of application. Sprayed material is usually soft. Cementitious material various from soft to relatively hard. Several methods have been proposed to eliminate or substantially reduce exposure of friable asbestos material such as encapsulation, enclosure and removal. For encapsulation, the asbestos material is coated with a sealant. The sealing of sprayed asbestos surfaces involves applying material that will penetrate and envelop the fiber matrix and coat the surface portions to eliminate fallout and protect against abrasion damage as well as physical damage due to impact.

Encapsulation methods should not be employed when friable asbestos materials evidence of severe physical damage such as loose hanging material. In the enclosure approach the friable material is separated from the building environment by physical barriers such as suspended ceilings or partitions. Removal procedures require that all the friable material is taken off the underlying surface, carefully collected and disposed of by burial.

Encapsulation, enclosure and removal can be used separately or in combination. Encapsulation and enclosure are containment methods and thus the friable material remains within the building environment. Both methods should be considered as temporary measures. Removal completely eliminates the source of exposure and is, therefore, a permanent solution.

Dry removal of untreated friable asbestos material is not recommended since it results in heavy airborne asbestos contamination (fiber counts that exceed 100 fibers per cubic centimeter). Dry vacuum methods have been attempted to overcome this contamination by incorporating an exhaust filtering system to prevent pollution of the outside environment and the use of sealed containers. One drawback with the dry vacuum system is that the adhesive bond between the friable material underlying surface may be stronger than the vacuum capabilities of the equipment. Thus, the necessary initial dislodgement by scraping causes particle contamination.

Preferred removal method involes wet removal with water to lower the friability of the sprayed material and the aerodynamic capabilities of the released fibers. Asbestos exposure levels may be reduced by as much as 75 percent over dry methods. However, water is not satisfactory because of slow penetration, incomplete wetting and runoff. The runoff is not only a safety and clean-up problem, but the resulting slurry carries fibers to other areas where they can become reentrained after drying.

Generally aqueous solutions containing surfactants are used for wet removal or stripping since the water penetration into a hydrophobic fiber matrix is significantly increased. Additionally aqueous surfactant solutions greatly reduce the amount of water needed for saturation, increase the cohesiveness of the fiber matrix and individual fiber wetting. Notwithstanding these advantages the above surfactant solutions suffer the same drawback as water alone, i.e. after evaporation the fibers can become reentrained.

Therefore, a need persists for a stripping composition for friable material which overcomes the reentrainment problems, is easier to apply, improves working conditions and significantly reduces overall handling and environmental contamination.

SUMMARY OF THE INVENTION

The present invention provides a stripping composition useful for removing a friable material comprising a blend of PART I an aqueous silicate solution component comprising:
  (a) 5 to 30 weight percent of an aqueous alkali metal silicate selected from potassium silicate or a mixture of potassium silicate and sodium silicate
  (b) 0.01 to 1 weight percent of a cationic or nonionic surfactant;
  (c) 70 to 95 weight percent water; and PART II an acrylic polymer dispersion component comprising:
  (a) 45 to 65 weight percent of an acrylic polymer latex having a solids content of 40 to 65 weight percent, said acrylic polymer selected from the group consisting of homopolymers and copolymers of lower alkyl esters of acrylic acid or lower alkyl esters of an alpha-lower alkyl acid or mixtures thereof;
  (b) 0.01 to 10 weight percent of a reagent that reacts with said alkali silicate;
  (c) 35 to 55 weight percent water;

wherein the ratio of PART I to PART II provides a blended composition having a solids content between 5 and 30 weight percent.

The invention also provides a method for preparing the stripping composition in the form of a two component system wherein each of the components are prepared separately and includes a method for preparing the stripping composition which contains optional concentrations of the foregoing ingredients. This two component system allows for the moieties to be mixed at the job site providing a long pot life and insuring storage stability. The invention further provides a method of removing friable material by the application of the stripping composition thereto.

It is therefore an object of this invention to provide a method of removing friable material by the application of the stripping composition of this invention to maximize removal efficiency and safety, improve working conditions and significantly reduce environmental contamination.

It is a particular object of the present invention to provide a stripping composition for removing asbestos-containing friable material and facilitate improved dust control.

It is a further object of the present invention to provide a method of preparing the two components of a stripping composition in such a manner as to allow the final blended composition to be mixed with a minimum of worker skill and equipment.

DESCRIPTION OF THE PREFERRED EMBODIMENTS

According to this invention useful products providing effective stripping compositions for removing friable insulation materials from underlying substrates are supplied as a two part system. One part comprises an aqueous silicate dispersion of selected alkali metal silicates blended with a cationic or nonionic surfactant. The other part comprises an acrylic latex composition containing a reagent that is reactive with the alkali metal silicate of the first part. These two moieties are stored separately, have increased storage life, are mixed shortly before use and preferably are formulated so that equal parts by volume are mixed to form the stripping composition that is ultimately utilized.

While the individual materials that make up the present stripping compositions are well known and available commercially, the combination of these materials in the proportions recited provide a stripping composition which facilitates the removal of friable material, particularly with insulation materials such as asbestos and mineral-, rock-, slag-wool with sufficient penetration to encapsulate individual fibers or particles.

PART I, the aqueous silicate component of the stripping composition is prepared by blending potassium silicate or a mixture of potassium silicate and sodium silicate with a cationic or nonionic surfactant and then adding water to form the aqueous silicate dispersion.

The concentration of the alkali metal silicate in the aqueous silicate solution component of PART I can range from 25 to 30 weight and preferably from 15 to 25 weight percent and most preferably from 18 to 32 weight percent. The concentration of the nonionic or cationic surfactant can range from 0.01 to 10 weight percent, preferably 0.5 to 5.0 weight percent and most preferably from 0.1 to 1.0 weight percent.

Aqueous potassium silicate is commercially available as a liquid containing 54 to 71 weight percent water and the balance potassium silicate. The potassium silicate that is used preferably has a molar ratio of $K_2O/SiO_2$ between about 1 to 4, preferably from 1.5 to 3.75 and most preferably from 2.8 and 3.2

Aqueous sodium silicate is commercially available as a liquid containing 45 to 85 weight percent water and the balance sodium silicate. The weight ratio of $Na_2O/SiO_2$ is from 1.5 to about 3.75 in the commercially available materials.

While it is preferable that all the soluble silicate be in the form of potassium silicate it is not essential in achieving the advances of this invention that the soluble silicate consist entirely of potassium silicate. However, it has been discovered that mixtures of potassium silicate and sodium silicate having a major portion of potassium silicate provide the advantages of this invention. Preferably at least about 75 weight percent of the soluble silicate should be potassium silicate and most preferably at least about 95 weight percent. Suitable soluble silicates include potassium and sodium orthosilicate, potassium and sodium metasilicate, potassium and sodium metasilicate pentahydrate and potassium and sodium sequisilicate.

Nonionic or cationic surfactants can be employed as an ingredient in the aqueous polymer dispersion of PART II or in the akali metal silicate dispersion of PART I or in both of the solutions, as desired. However, it was found that strongly cationic surfactants, have a tendency to precipitate the polyacrylic latex should not be employed in the polymer dispersion.

Nonionic synthetic surfactants suitable for use in the present composition include:
  1. The polyethylene oxide condensates of alkyl phenols.

2. The condensation products of aliphatic alcohols and ethylene oxide.
3. The condensation products of ethylene oxide with a hydrophobic base formed by the condensation of propylene oxide with propylene glycol.
4. Condensation products of amines, amides or mercaptans with ethylene oxide or propylene oxide.
5. Products formed by reacting ethanolamines with fatty acids.
6. Amine oxide surfactants.
7. Phosphine oxide surfactants.
8. Sulfoxide surfactants.

Of all the above described types of nonionic surfactants preferred nonionic surfactants include the condensation product of nonyl phenol with about 9.5 moles of ethylene oxide per mole of nonyl phenol, the condensation product of coconut fatty alcohol with about 6 moles of ethylene oxide per mole of coconut fatty alcohol, the condensation product of tallow-fatty alcohol with about 11 moles of ethylene oxide per mole of tallow-fatty alcohol, the condensation product of a secondary fatty alcohol containing about 15 carbon atoms with about 9 moles of ethylene oxide per mole of fatty alcohol, dimethyldodecylamine oxide, dimethyltetradecylamine oxide, dimethyldodecylphosphine oxide, cetyldimethyl phosphine oxide, octadecylmethyl sulfoxide, and tetradecylmethyl sulfoxide.

Cationic synthetic surfactants suitable for use in the present composition include:
1. Amine salts.
2. Fatty esters of primary, secondary or tertiary hydroxyalkyl amines.
3. Quaternary ammonium compounds, pyridinium salts and like compounds in which the quarternary nitrogen atom is part of a ring system.

Specific examples of cationic surfactants include cetyl pyridinium chloride, cetyl trimethyl ammonium chloride, stearyl dimethyl benzyl ammonium chloride, lauryl dimethyl benzyl ammonium chloride, quaternary ammonium chloride, trimethyl octadecyl ammonium chloride, methyl polyethanol quaternary amine, didecyl dimethyl ammonium chloride, tetradecyl benzyl ammonium chloride dihydrate, coco hydroethyl imidazoline, tall oil hydroxyethyl imidazoline and oleic hydroxyethyl imidazoline.

Various other nonionic and cationic synthetic surfactants which can be employed are described in "Surface Active Agents and Detergents", Vol. II by Schwartz, Perry and Birch, Interscience (1958) and "Detergents and Emulsifiers, 1972 Annual (McCutcheon's Div., Allured) which are incorporated by reference.

PART II, the acrylic polymer dispersion component, is prepared by diluting the acrylic polymer latex with water then adding a water soluble reagent that reacts with the alkali silicate of the first part and blending until a homogeneous composition is formed. Adding a weak base such as ammonium hydroxide to adjust the pH to about 4.2.

The concentration of acrylic polymer latexes may range from 45 to 65 weight percent, preferably from 45 to 65 weight percent and most preferably from 50 to 55 weight percent. The concentration of the water soluble reagent that reacts with the alkali silicate of the first part may range from 0.01 to 10 weight percent, preferably from 0.1 to 5 weight percent and most preferably 0.5 to 2 weight percent.

The acrylic polymer latex used in PART II are available commercially or can be readily prepared by well-known polymerization procedures. Suitable acrylic polymer latex compositions include homopolymers of lower alkyl esters of acrylic acid, lower alkyl ester of an alpha-lower alkyl acrylic acid or copolymers thereof, that is polymers made of two or more different acrylic acid esters and/or alpha-lower alkyl acrylic esters and copolymers of the aforementioned acrylic esters with vinyl acetate. These acrylic polymer latexes are available in emulsion form with a solids content of about 45 to 65 weight percent a pH of 4 to 5, a viscosity of 2 to 4 poises and ranging from 8.0–9.25 pounds per gallon.

A wide variety of reagents can be employed to react with the alkaline metal silicate to enhance the curing and encapsulating properties of the present stripping composition. The reagents suitably employed for this purpose include water soluble and water dispersible inorganic or organic salts and oxides of polyvalent and alkali metals. Preferred compounds are those which impart flame retardant properties to the sealant composition. Such agents include metal salts of hydroxycarboxylic acids, salts of organic acids, e.g. gallic acid, citric acid and tartaric acid. Water soluble salts are preferred inclusive of which include the borate, halide, nitrate and phosphate salts of aluminum, antimony, barium, beryllium, cadmium, calcium, chromium, cobalt, copper, lead, magnesium, mercury, silver and zinc. Most preferred reagent compounds are those which impart flame retardant properties such as potassium silicofluoride, zinc silicofluoride and hydrated sodium borate (borax).

Obviously, it may be desirable to include or add additional materials to facilitate the preparation or application of the stripping compositions, or to impart collateral benefits or properties to stripping products. For example, in certain applications it may be advantageous to include anti-freeze compositions, foam inhibitors, etc. Additionally if a colored product is desired, a water dispersible pigment may be added to PART II to give the composition a desirable color.

In accordance with the method of the invention, PART I and PART II formulations are separately prepared and subsequently mixed. Preferably, each part is formulated so that equal parts of each are mixed to provide ease of preparation of the stripping composition and minimize formulating errors at the job site. In any event each moiety should be formulated within the specific proportions given to yield a blended stripping composition ready for application having a total solids content between 5 and 30 weight percent preferably between 10 and 20 weight percent and most preferably between 15 and 20 weight percent.

Prior to the application of the stripping composition all openings and fixtures, including heating and ventilating ducts, doors, windows should be sealed and secured.

The mixing of the two moieties may occur in several ways. The materials may be introduced into a common container and blended by agitation. The two liquid materials may be sprayed separately at low pressure with the sprays of the two materials impinging upon one another to provide a combined spray in which the spray particles are homogeneously admixed. The two liquids may be introduced into spraying equipment which has a common mixing chamber preceding the spray nozzle.

Application of the stripping composition of this invention can also be by brushing. The viscosity of the sealant composition which can be obtained by blending an aqueous acrylic resin dispersion with an aqueous potassium silicate or mixtures of potassium silicate and sodium silicate is expediently so adjusted that a readily brushable mixture can be obtained. Low pressure spraying is preferred. The stripping composition should be applied with as much caution and at as low a nozzle pressure as possible to reduce surface contact disturbance on the dry friable asbestos-containing material since a potentially high concentration of small asbestos fibers could cause serious exposure to the worker. In any event workers should require protection with respiratory devices and decontamination. Low pressure airless spray units available commercially are suitable for such application.

The application of this composition does not require any particular skill. Upon application the friable material should be saturated to prevent emission of airbone fibers.

Such coverage of the stripping composition varies depending on the nature and the condition of the friable material and ranges from 10 to 50 square feet per gallon with an average penetration depth of about 1¾ inches. For example, highly friable asbestos-material (could be damaged by hand contact) but having no loose material hanging free, would require a coverage of about 40 square feet with the same penetration depth.

Removal of the wet friable material is accomplished by scraping with proper tools and working small sections. The wet friable material is packed in plastic lined drums and sealed. Preferably the drum is equipped with a vapor vent to enable the moisture to evaporate. Exposure of the coated material to ambient temperatures (e.g. 65° F. for a period of three hours) is ordinarily sufficient for the accomplishment of the desired curing and evaporation. Of course, variations in ambient temperatures will effect length of cure.

Upon curing the present silicate-polymer composition provides an effective encapsulating composition for friable materials such a glass fibers, cellulose, the various mineral wools, synthetic resin foams (polyurethane, polystyrene, polyvinyl chloride etc.) and particularly asbestos-containing materials. The active ingredients in the composition form a polymerized product which eliminates fiber redispersal by adhering to the fibrous substrate with more than sufficient adhesion to prevent the separation of the cured product from the fiber. Thus, providing added protection should the sealed drum be damaged prior to or after burial.

The primary utility of the penetrating sealant composition of this invention is directed to its application to friable asbestos material, i.e., material that can be crumbled, pulverized or reduced to powder in the hand, to change this soft or loosely bound material to a strong coherent mass. However, these compositions can also be applied to cementatious or semi-cementatious asbestos-containing material, as well as other types of insulating material such as synthetic organic polymer foams, glass fibers, rock wool etc. with the same beneficial results.

The invention can be further understood by referring to the following examples in which parts and percentages are by weight unless otherwise indicated. The following are examples of various composition formulations for specific and general use, and their method of application. It is to be understood, that the compositions for and method of applying the same to specific asbestos articles or products are exemplary and are not considered to limit the invention to any of the particular compositions or operating conditions outlined.

PREPARATION OF STRIPPING COMPOSITIONS

Example 1

Part I: Silicate Component

A solution of 22.5 gallons of an aqueous potassium silicate solution having a $K_2O/SiO_2$ ratio of 3.13 and a solids content of 33% (KSIL No. 6, Philadelphia Quartz Co., Philadelphia, Pa.) and 32.5 gallons of water were slowly agitated for approximately 5 minutes to insure complete solution. To the solution obtained, 1 gallon of an octylphenoxy polyethoxy ethanol was added with slow agitation until thoroughly blended.

Part II: Acrylic Polymer Latex Component

A dispersion of 10 gallons of an acrylic latex having a solids content of 45%, a viscosity of 6 poises and a pH of about 4.5 (UCAR ® Latex 879, Union Carbide Corporation, New York, N.Y.) and 0.87 gallons of diammonium phosphate are slowly agitated until thoroughly blended. This blended dispersion was then diluted with 44 gallons of water.

PARTS I and II are stored separately until use. Both parts are quite stable. The final stripping formulation is prepared by simple mixing of the components prior to use.

Example 2

This example shows another formulation of the PART I silicate component which is compatible with PART II of Example 1.

A solution of 22.5 gallons of an aqueous silicate component consisting of 95% potassium silicate and 5% sodium silicate and 1 gallon of octylphenoxy polyethoxy ethanol is slowly agitated and then diluted with 32.5 gallons of water.

REMOVAL OF FRIABLE ASBESTOS-CONTAINING MATERIAL

Example 3

The trial substrate was a friable asbestos-containing material (30 to 35 percent chrysotile) applied approximately 2 inches thick over precast concrete slabs, steel support I-beams and metal duct work. No loose insulation material was hanging down.

The test area was completely sealed from the surrounding environment.

Equal volume portions of PART I the silicate component and PART II of Example 1 are thoroughly mixed to form a sprayable stripping composition. The resulting composition is charged to a supply tank of an airless spray gun.

A fine spray of the stripping composition is applied to reduce fiber release preceding the removal of the asbestos-friable material. The material is sufficiently saturated to prevent emission of airborne fibers and then scraped. The material is packed while still wet into sealable plastic bags and placed into fiber or metal drums for burial.

Throughout the removal procedure the air was monitored according to the method prescribed by Section 1910, 1001(f) of the Occupational Safety and Health Administration (OSHA) regulations.

Example 4

Equal volumes of PART I of Example 2 and PART II of Example 1 were mixed thoroughly to form a sprayable stripping composition. The method of application according to Example 3 was repeated to similar substrates.

In each application, performed according to Example 3 and Example 4, the fiber counts were reduced by almost 95 percent as compared to dry removal. This reduction of fiber contamination within the work area not only reduces potential worker exposure but relieves much of the dependence upon containment barrier systems for isolation of fibers within removal areas.

Other aqueous stripping formulations according to this invention can be employed in the above method.

What is claimed is:

1. A stripping composition useful for removing a friable material comprising a blend of
PART I an aqueous silicate solution component comprising:
   (a) 5 to 30 weight percent of an aqueous alkali metal silicate selected from potassium silicate or a mixture of potassium silicate and sodium silicate;
   (b) 0.01 to 10 weight percent of a cationic or nonionic surfactant;
   (c) 70 to 95 weight percent water; and
PART II an acrylic polymer dispersion component comprising:
   (a) 45 to 65 weight percent of an acrylic polymer latex having a solids content of 40 to 65 weight percent, said acrylic polymer selected from the group consisting of homopolymers and copolymers of lower alkyl esters of acrylic acid or lower alkyl esters of an alpha-lower alkyl acid or mixtures thereof;
   (b) 0.01 to 10 weight percent of a reagent that reacts with said alkali silicate;
   (c) 35 to 55 weight percent water;
wherein the ratio of PART I to PART II provides a blended composition having a solids content between 5 and 30 weight percent.

2. The composition according to claim 1, wherein said aqueous metal silicate is potassium silicate.

3. The composition according to claim 1, wherein said aqueous alkali metal silicate comprises 75 to 95 weight percent of aqueous potassium silicate and from about 5 to 25 weight percent sodium silicate.

4. The composition according to claim 1 wherein said acrylic polymer latex has a solids content of 45 to 60 weight percent.

5. The composition according to claim 1, wherein the volume ratio of PART I to PART II is 1 to 1.

6. The composition according to claim 1 wherein said reagent is selected from the group consisting of the borate, halide, nitrate and phosphate salts of aluminum, antimony, barium, beryllium, cadmium, calcium, chromium, cobalt, copper, lead, magnesium, mercury, silver and zinc.

7. The composition according to claim 6, wherein said reagent is potassium silicofluoride, zinc silicofluoride and hydrated sodium borate.

8. The method of preparing a stripping composition according to claim 1 comprising the steps of
   (a) separately preparing said aqueous silicate solution and the acrylic polymer latex component by mixing predetermined ingredients in said range of concentrations;
   (b) preparing said predetermined ingredients of said silicate solution by the steps comprising:
      (1) adding said cationic or nonionic surfactant to a stirred aqueous alkali metal silicate solution selected from potassium silicate and mixtures of potassium silicate and sodium-silicate;
      (2) adding water;
      (3) stirring until a homogenous mixture is formed;
   (c) preparing said predetermined ingredients of said acrylic polymer latex component comprising:
      (1) stirring said acrylic polymer latex and adding water;
      (2) adding said reagent that reacts with said alkali metal silicate component to said stirred acrylic latex component;
      (3) stirring until a homogeneous mixture is formed;
   (d) storing said aqueous silicate component and said acrylic polymer latex component separately before use; and
   (e) mixing said aqueous silicate component and said acrylic polymer latex component.

9. The method of claim 8 wherein said silicate component and said acrylic polymer latex component are mixed in a volume ratio of 1 to 1.

10. The method of claim 8 wherein the alkali metal silicate is potassium silicate.

11. The method of claim 8 wherein the alkali metal silicate is a mixture of potassium silicate and sodium silicate.

* * * * *